(12) United States Patent
Hedger et al.

(10) Patent No.: US 9,234,590 B2
(45) Date of Patent: Jan. 12, 2016

(54) SEAL

(71) Applicant: GSSC, Inc., Clearwater, FL (US)

(72) Inventors: Tom Hedger, Trinity, FL (US); Blake K. Travis, II, Clearwater, FL (US); James Wiegand, Auburn, WA (US)

(73) Assignee: MAGNUM VENUS PRODUCTS, INC., Knoxville, TN (US)

( * ) Notice: Subject to any disclaimer, the term of this patent is extended or adjusted under 35 U.S.C. 154(b) by 218 days.

(21) Appl. No.: 13/798,221

(22) Filed: Mar. 13, 2013

(65) Prior Publication Data

US 2014/0259606 A1  Sep. 18, 2014

(51) Int. Cl.
| | |
|---|---|
| *F16J 15/32* | (2006.01) |
| *B05B 7/04* | (2006.01) |
| *B05B 7/12* | (2006.01) |
| *B05B 7/24* | (2006.01) |

(52) U.S. Cl.
CPC ........... *F16J 15/3204* (2013.01); *B05B 7/0408* (2013.01); *B05B 7/1209* (2013.01); *B05B 7/1236* (2013.01); *B05B 7/2405* (2013.01); *Y10T 29/4987* (2015.01); *Y10T 29/49826* (2015.01); *Y10T 29/49963* (2015.01)

(58) Field of Classification Search
CPC .. F16J 15/3204; B05B 7/1209; B05B 7/2405; B05B 7/1236; B05B 7/0408; Y10T 29/49826; Y10T 29/49963
See application file for complete search history.

(56) References Cited

U.S. PATENT DOCUMENTS

| | | |
|---|---|---|
| 2,878,063 A | 3/1959 | Kish et al. |
| D314,811 S | 2/1991 | Gammons et al. |
| D457,599 S | 5/2002 | Karwoski et al. |
| D479,305 S | 9/2003 | Zittel et al. |
| D588,230 S | 3/2009 | Mattson et al. |
| D588,231 S | 3/2009 | Pellin et al. |
| 8,016,213 B2 | 9/2011 | Altenburger |
| D649,221 S | 11/2011 | Sinders et al. |
| 8,496,194 B2 | 7/2013 | Baltz |
| 2009/0241766 A1 * | 10/2009 | Onishi et al. ............... 92/13 |

* cited by examiner

*Primary Examiner* — John C Hong
(74) *Attorney, Agent, or Firm* — Larson & Larson, P.A.; Frank Liebenow; Patrick Reid

(57) ABSTRACT

A shaft seal includes a lip at the low pressure end with a tapered cylindrical body extending from the lip. The tapered cylindrical body has a first diameter where the tapered cylindrical body meets the lip and a second diameter at a distal end that is exposed to a high pressure fluid. An aperture is formed through the lip and through the tapered cylindrical body following an axis of the tapered cylindrical body. The aperture has a first end at the lip and a distal second end. At the first end, the aperture has a first inner diameter that is slightly greater than the outer diameter of the shaft at the distal end, the aperture tapers to a second inner diameter which is approximately the diameter of the shaft. An o-ring, is positioned around the tapered cylindrical body applying pressure on the tapered cylindrical body against the shaft.

7 Claims, 8 Drawing Sheets

SEAL

CROSS-REFERENCE TO RELATED APPLICATION

This application is related to copending U.S. patent application titled "System, Method, and Apparatus for Mixing and Spraying Resin and Catalyst" which was filed on even date herewith. This application is related to copending U.S. patent application titled "Reduced Wear Valve" which was filed on even date herewith; Ser. No. 13/798,224. This application is related to copending U.S. patent application titled "Spray Gun with Interchangeable Handle Grips" which was filed on even date herewith; Ser. No. 13/798,236.

FIELD

This invention relates to the field of spraying pressurized fluid components and more particularly to a method, system and apparatus for improving a seal.

BACKGROUND

Devices that mix and spray pressurized fluids such as paints and resins have progressed in the art. Certain materials need to be mixed just before application, for example, a resin and a catalyst. If mixed before application, depending upon the time lag between the mixing and the application steps, the mixed resin and catalyst may settle, providing an uneven application, or even worse, may begin to harden.

Resins have numerous uses including forming and coating boat hulls, spas/hot tubs, bath tubs, sinks, etc. A resin such as polyester is typically mixed with a catalyst such as methyl-ethyl-ketone peroxide and applied to a surface. Catalysts allow the resin to cure, otherwise, the resin would remain fluid and sticky.

Early spraying systems emitted resin from one nozzle and catalyst from a second nozzle, in theory, mixing the resin and catalyst in air and after contact with the target surface. Such devices effectively spray the resin and catalyst, but uniform mixing of the resin and catalyst is important for proper application to various surfaces.

U.S. Pat. No. 2,878,063 to Stephen P. Kish is an example showing a spray gun in which the catalyst and resin are mixed in a stream of air emanating from a trigger gun. This is an example of an external mix gun. In an external mix gun, the resin and catalyst are atomized separately and directed toward each other. The resin and catalyst combine in the air before contacting the target. As discussed previously, this often results in an incomplete mixing of resin and catalyst. When the catalyst is atomized separately from the resin, much of the atomized catalyst disperses into the atmosphere and in the work environment where the application is taking place. This causes safety concerns for people breathing catalyst contaminated air leading to restricted use of external mix guns.

A gun in which the resin and catalyst are mixed internally is often used when solvent emissions are a problem, because internal mixing reduces the amount of atomized catalyst escaping into the atmosphere. Internal mix guns typically have three inputs: resin, catalyst, and air, all three under pressure. In the past, the resin and catalyst are typically mixed in the manifold. The mixture of resin and catalyst are then expelled from a gun through a nozzle along with pressurized air. The resin and catalyst are atomized by the pressurized air.

I some prior spraying devices, the resin and catalyst are introduced into a mixing area where they combine as they flow toward a spray tip or nozzle. A pressurized air stream helps mix the catalyst and resin and also helps expel the catalyst/resin mixture from the nozzle. In such designs, if there is an imbalance in the pressure of the resin and catalyst, the combined resin and catalyst will back up into the supply that has lower pressure, especially if a clog occurs. Furthermore, it is undesirable to introduce catalyst at the same high pressures of the resin since the catalyst is often less viscous and, at times, a serious health risk. It is also difficult to mix the catalyst and resin in the mixing area because, often, the relatively high viscosity catalyst often creates a tunnel through the resin within the mixing area instead of completely mixing with the resin.

What is needed is a system, method and apparatus that will seal a pressure side of a shaft from a non-pressure side of that shaft.

SUMMARY

In one embodiment, a shaft seal for reducing leakage between a high pressure side and a low pressure side is disclosed including a lip at a low pressure end of the shaft seal and a tapered cylindrical body extending from the lip. The tapered cylindrical body has a first diameter where the tapered cylindrical body meets the lip and the tapered cylindrical body has a second diameter at a distal end. The distal end is the end that is exposed to a high pressure fluid. An aperture passes (is formed) through the lip and the tapered cylindrical body following an axis of the tapered cylindrical body. The aperture has a first end at the lip and a distal second end. The aperture has a first inner diameter slightly greater than the outer diameter of the shaft at the first end and the aperture tapering to a second inner diameter at the distal end of the aperture. The second inner diameter is approximately the diameter of the shaft.

In another embodiment, a method of sealing a low pressure area from a high pressure area is disclosed including inserting a shaft through the aperture of the seal previously described then mounting the seal onto a cartridge. A rod seal housing is threaded and tightened onto the cartridge, thereby containing the seal.

In another embodiment, a shaft seal for reducing leakage between a high pressure side and a low pressure side is disclosed including a lip at the low pressure end of the shaft seal and a tapered cylindrical body extending from the lip. The tapered cylindrical body has a first diameter where the tapered cylindrical body meets the lip and the tapered cylindrical body has a second diameter at a distal end that is exposed to a high pressure fluid. An aperture is formed through the lip and through the tapered cylindrical body following an axis of the tapered cylindrical body. The aperture has a first end at the lip and a distal second end. At the first end, the aperture has a first inner diameter that is slightly greater than the outer diameter of the shaft At the distal end, the aperture tapers to a second inner diameter which is approximately the diameter of the shaft. An o-ring, is positioned around the tapered cylindrical body such that a resilient force of the o-ring applies pressure on the tapered cylindrical body against the shaft.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
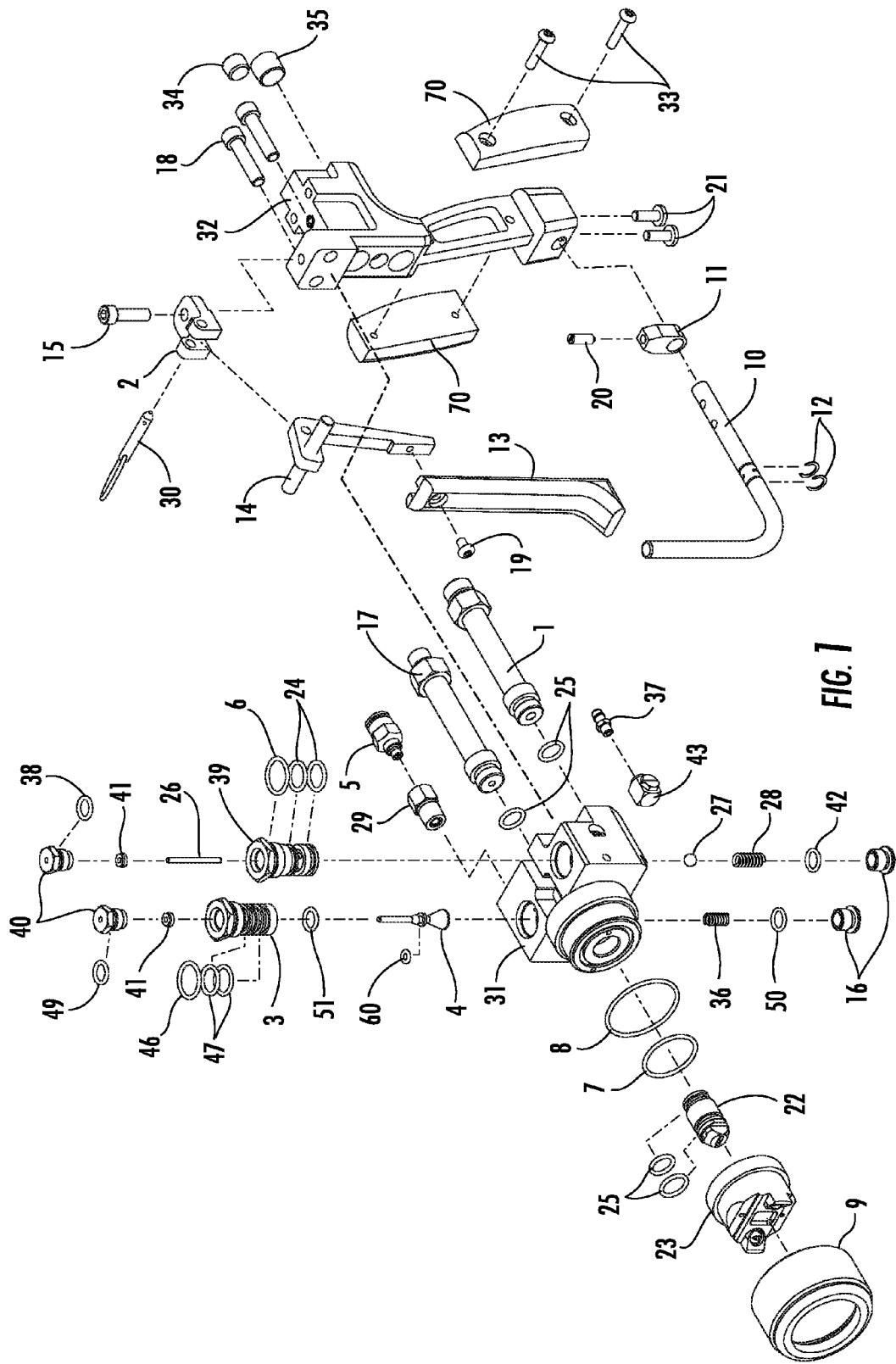
FIG. 1 illustrates an exploded view of a spray gun.

Reference will now be made in detail to the presently preferred embodiments of the invention, examples of which are illustrated in the accompanying drawings. Throughout the following detailed description, the same reference numerals refer to the same elements in all figures.

The following is a description of a dual component, mono-valve spraying system for dispensing of both liquid and air for applications where a spray gun or similar device is used in various industries such as the composite industry, adhesive industry, paint industry, coating industry, and polymer industry, etc.

The exemplary spray gun (see FIG. 7) is one embodiment of the various internal and external components disclosed that provide proper dispensing of plural components, often referred to a 2K Coatings and Material industry. In such, it is known to have a dispensing head that includes two or more valves to control the flow of two liquids that are dispensed together. In some examples of the prior art, the materials are mixed internally, while in other examples, the materials are mixed externally, after the leave the dispensing head. The use two independent valves have issues related to specific fluids as well as space requirements in hand-held spraying devices.

The disclosed spray system utilizes a unique valve arrangement that provides for the control of two materials with a single actuator. In this, a single valve controls the release of air and a fluid that, when released, are channeled into a common outlet where they commingle before exiting the sprayer. Previous technology required two separate valves, one for the pressurized air and the other for the liquid. Prior attempts at a single actuator valve required a seal (e.g., o-ring) to be passed over an orifice in the valve, causing wear and/or gouging/nicking of the seal (o-ring). Such designs also required check valves, increasing the parts count, weight, and decreasing reliability. Again, for hand-held spray guns that are used for reasonable periods of time, the weight and size of the spray gun is important, and extra components lead to larger/heavier spray guns.

Referring to FIG. 1, an exploded view of a spray gun is shown. The exemplary spray gun disclosed is for illustrative purposes and does not limit any of the inventions disclosed, in that, there are several inventive components and/or subsystems that are disclosed with respect to the exemplary spray gun shown in FIG. 1 and any or all such components and/or subsystems are anticipated for use in a variety of applications and are not limited to the exemplary spray gun. Additionally, it is anticipated that the size, shape, and assembly of the spray gun be varied to meet particular applications.

The spray gun handle 32 is affixed to the gun head assembly 31 by a plurality of cap screws 18. Handle grips 70 are affixed to the sides of the spray gun handle 32 by fasteners 33. The trigger 13 is attached to a trigger arm 14 by a fastener 19. The trigger arm 14 is pivotally held to the spray gun handle 32 by a trigger mount 2 and pivot pin 30. In a preferred embodiment, the pivot pin 30 is a quick release pin 30. The trigger mount 2 is fastened to the spray gun handle 32 by, for example, a cap screw 15. A trigger guard 10 includes a trigger stop 11 that is held in position on the trigger guard 10 by two retainer rings 12, allowing rotation of the trigger guard 10. A spring plunger 20 set into the trigger stop 11 mates with detents on the trigger guard 10, providing 90 degree stops for the trigger stop 11 as it is rotated around the trigger guard 10. The trigger stop 11 is used in an upright position (body of the trigger stop 11 is positioned to interfere with the trigger 13) to prevent accidental actuation of the trigger 13 or to lock the trigger 13 in the open position during long periods of spraying to reduce fatigue. The trigger guard 10 is held to the trigger handle 32 by fasteners 21 (e.g. pan head screws). Two clips 12 maintain the location of the trigger stop 11 on the trigger guard 10.

For completeness, though not required for operation, some spray guns include ports for extra valves that supply an air signal to a safety valve or send air to a fiberglass chopper motor. These ports are not visible in FIG. 1, but optional covers 34/35 are shown that cover such ports, when present.

The catalyst fitting 17 and resin fitting 1 attach to the gun head assembly 31 and are sealed with o-rings 25. Compressed air enters the gun head assembly through a compressed air fitting 5. To prevent catalyst from flowing back through the compressed air lines, an optional check valve 29 is placed in fluid communications between the compressed air fitting 5 and the gun head assembly 31. Pressurized air enters the air fitting 5 and as will be discussed, under control of a dual input valve, mixes with catalyst, thereby causing the catalyst to "atomize" into droplets.

An air supply port for what is called Air Refinement that is used to trim in the edges of the spray pattern coming out of the spray gun is provided through a fitting 37 (e.g., a barbed fitting) that is in fluid communications with an elbow 43 (e.g., a swivel elbow). This pressurized air is used to aim the spray, but is not mixed with the catalyst/resin before the catalyst/resin is sprayed.

A catalyst tip 23 is mounted to the front of the gun head assembly 31 by a retaining ring 9 and sealed with one or more o-rings 7/8. At the center of the catalyst tip 23 is held a spray tip 22 which is sealed to the gun head assembly 31 by one or more additional o-rings 25.

As will be described in detail, there are two separate valve assemblies housed by the gun head assembly 31, the operation of which is described in FIGS. 2-5. Both valves are operated in tandem by the movement of the trigger arm 14. When the trigger 13 is pulled towards the handle 32, the trigger arm 14 swivels around the pin 30 resulting in an actuating pressure on both valve stems 4/26. The valve stems 4/26 are held within chambers of the gun head assembly 31 by an upper sealing system that includes rod seal caps 40, rod seals 41, o-rings 38/49/46/47/6/24, and cartridges 3/39. The dual input valve stem 4 includes a captured o-ring 60, as will be discussed.

The mono input valve stem 26 operates a ball valve by way of a ball 27 that is biased in the closed position within the gun head assembly 31 by a mono valve spring 28 that is held within the gun head assembly 31 by a cap 16, sealed by an o-ring 42.

The dual input valve stem 4 is biased in the closed position within the gun head assembly 31 by a dual valve spring 36 that is held within the gun head assembly 31 by a cap 16, sealed by an o-ring 50. An optional o-ring 51 provides an enhanced seal to the dual input valve.

Figure 2:
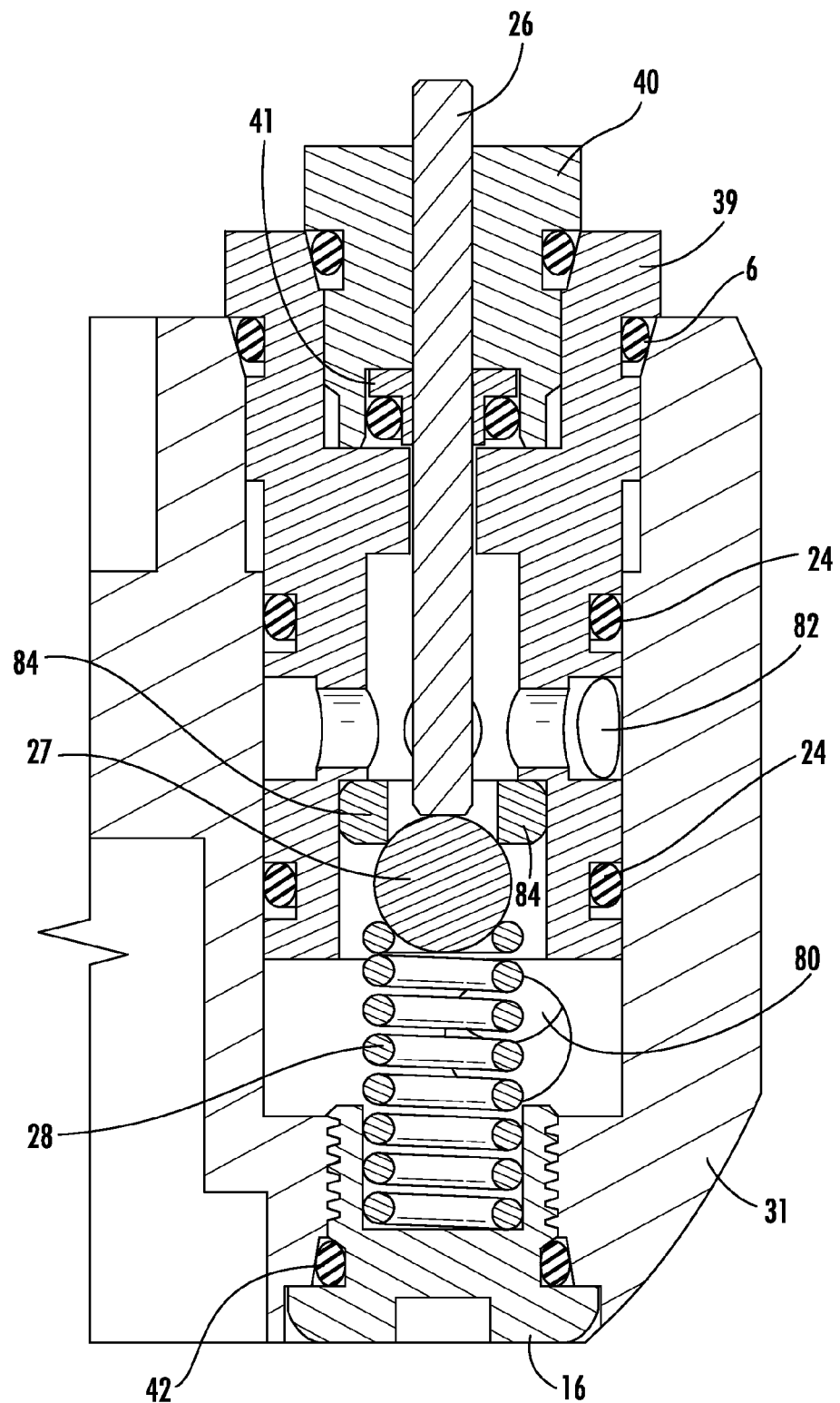
FIG. 2 illustrates a cross-sectional view of a resin valve in a closed position.
Figure 3:
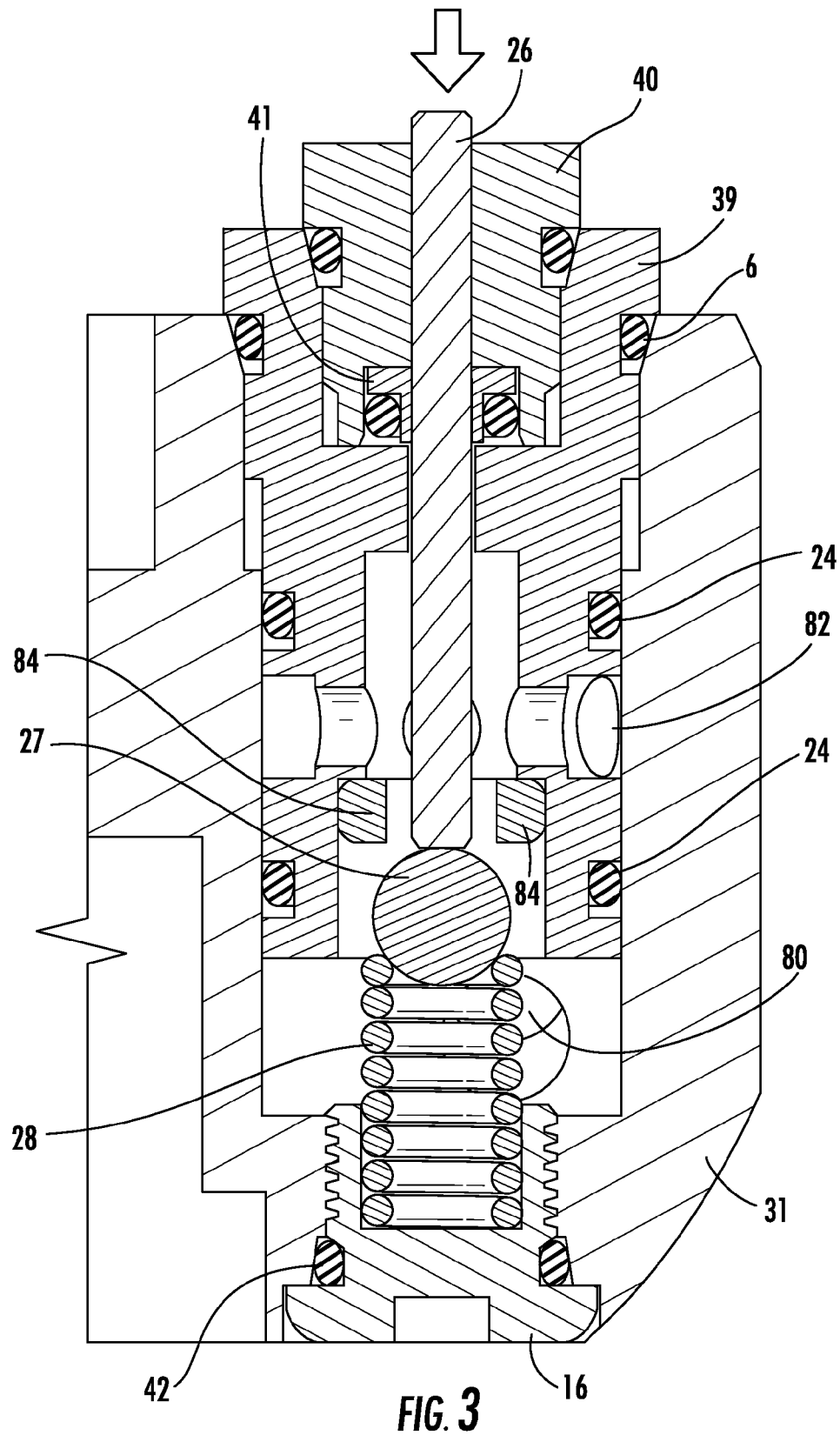
FIG. 3 illustrates a cross-sectional view of the resin valve in an open position.

Referring to FIGS. 2 and 3, cross-sectional views of a resin valve in a closed position (FIG. 2) and an open position (FIG. 3) are shown. Resin enters the gun head assembly 31 from the resin fitting 1 through a resin input port 80 into an area on the pressure side of the ball 27. Note that in a preferred embodiment, the ball 27 is made of ceramic or silicon nitride ceramic, though other suitable materials are anticipated. The pressure of the resin and the bias of the mono valve spring 28 hold the ball 27 against the ball valve seat 84 (as shown in FIG. 2), preventing flow of resin.

When the trigger 13 is operated (pulled towards the handle 32), the trigger arm 14 swivels around the pin 30, thereby displacing the mono valve actuating rod 26 in a direction towards the ball 27, thereby dislodging the ball 27 from the ball valve seat 84 (as shown in FIG. 3). Once the ball 27 is dislodged from the ball valve seat 84, resin flows from the resin input port 80 around the ball 27 and ball valve seat 84 and out a resin output port 82 to the spray tip 22. Note, that in a preferred embodiment, the resin flows around the mono valve actuating rod 26, in effect lubricating the mono valve actuating rod 26, but also requiring a sealing system including the rod seals 41. The rod seals 41 prevent the resin from leaking out of the rod seal caps 40, as will be explained along with FIG. 6. Also, because the mono valve actuating rod 26 and rod seals 41 are on the low pressure side of the ball 27, the mono valve actuating rod 26 and rod seals 41 are not exposed to the high pressure from the resin input port 80 when the mono valve is in the closed position (e.g. the ball 27 is seated in the ball valve seat 84).

Figure 4:
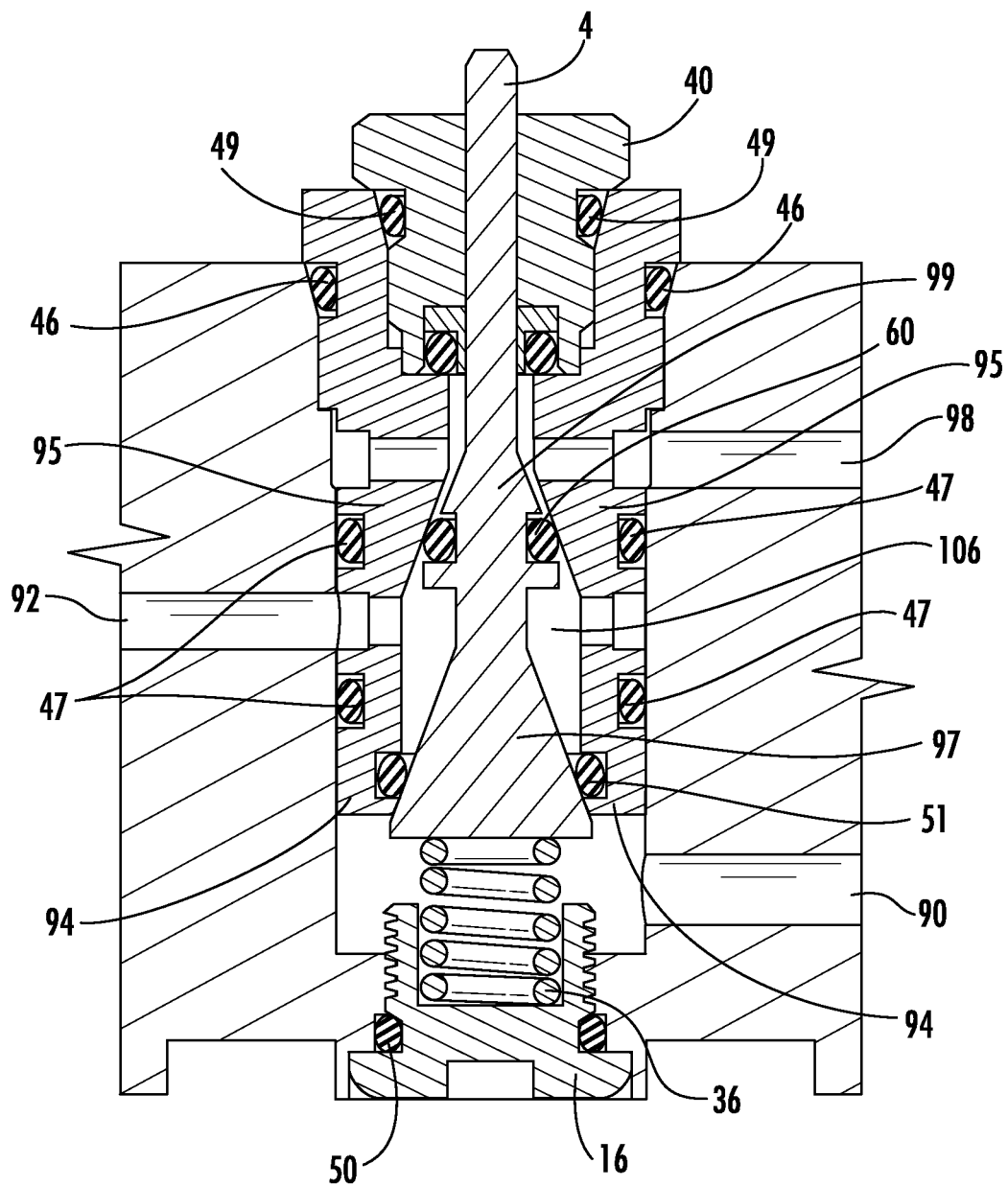
FIG. 4 illustrates a cross-sectional view of a dual input valve (catalyst/air valve) in a closed position.
Figure 5:
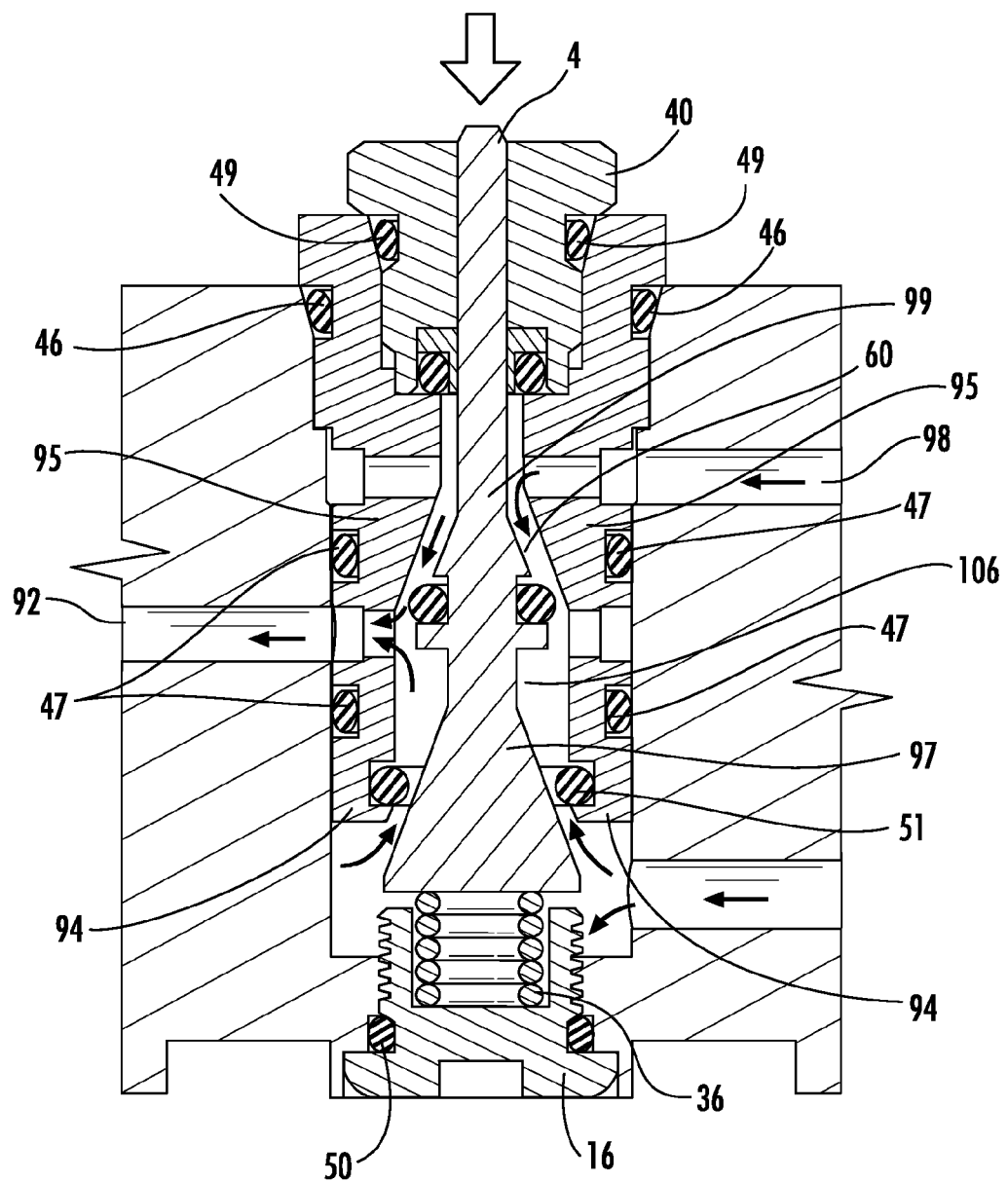
FIG. 5 illustrates a cross-sectional view of the dual input valve in an open position.

Referring to FIGS. 4 and 5, cross-sectional views of a catalyst/air valve (dual input valve) in a closed position (FIG. 4) and in an open position (FIG. 5) are shown. Catalyst enters the gun head assembly 31 from the catalyst fitting 17 through a catalyst input port 90 into an area on the pressure side of the catalyst valve 97 (formed on the dual input valve stem 4). The pressure of the catalyst and the bias of the dual input valve spring 36 hold the catalyst valve 97 against the catalyst valve seat 94 (as shown in FIG. 4), preventing flow of catalyst from the catalyst input port 90 through to the mixing chamber 106. An optional o-ring 51 further enhances this seal.

Compressed air enters the gun head assembly 31 from the compressed air fitting 5 through a compressed air input port 98 into an area on the upper pressure side of the dual input valve stem 4. The pressure of the catalyst and the bias of the dual input valve spring 36 hold the compressed air valve 99 of the dual input valve stem 4 and seated o-ring 60 against the compressed air valve seat 95 (as shown in FIG. 4), preventing flow of compressed air from the compressed air input port 98 through to the mixing chamber 106.

When the trigger 13 is operated (pulled towards the handle 32), the trigger arm swivels around the pin 30, thereby displacing the dual input valve stem 4 in a direction towards the dual input valve spring 36, thereby dislodging both catalyst valve 97 from the catalyst valve seat 94, and the compressed air valve 99 and seated o-ring 60 from the compressed air valve seat 95 (as shown in FIG. 5). Once the catalyst valve 97 is dislodged from the catalyst valve seat 94, catalyst flows from the catalyst input port 90 into the mixing chamber 106. Likewise, once the compressed air valve 99 and seated o-ring 60 dislodge from the compressed air valve seat 95, compressed air flows from the compressed air input port 98 into the mixing chamber 106. The catalyst and compressed air mix within the mixing chamber 106 and flow out through a dual valve output port 92 to the spray tip 22.

The dual input valve controls the flow of two materials with actuation of only one stem, the dual valve stem 4. In this, the dual input valve opens and closes the flow of both a fluid and pressurized air. When open, the air and fluid are channeled to a mixing chamber 106 where they commingle and then exit the valve housing 31 through the dual valve output port 92, to a nozzle of, for example, a spray or dispensing gun.

Previous technology used either separate valves to control flow of both materials, or a single valve with only dynamic o-rings or seals. The separate valves of the prior art, bulk becomes an issue because two separate valves are used, which is a liability with a hand-held dispensing gun because of weight and size. With the single valve of the prior art, problems often occur when dynamic soft seals or o-rings pass over orifices that deliver or vacate the fluids, often causing gouging or "nicking" of these seals. This problem is exacerbated when one of the materials is incompatible with the other or there are contaminants in the materials (i.e., an oil or water vapor in the compressed air from the compressor which causes seal swelling). In addition, check valves are often needed which also add bulk, are often not reliable, and increase the number of necessary parts and, hence, size and weight.

The operation of the disclosed dual input valve is initiated by movement of the dual input valve stem 4 that has two tapered pistons (catalyst valve 97 and compressed air valve 99) that moves back and forth along an axis. The dual input valve is held within a housing (part of the head assembly 31) and held closed by, for example, a compression spring 36 and further by some degree of fluid pressure from the catalyst input port 90. The dual input valve is opened by applying pressure to an actuating rod (dual input valve stem 4) which in turn causes the spring 36 to compress. When the pressure to the actuating rod is released the spring 36 urges the dual input valve stem 4 back to the closed position. The dual input valve uses both a dynamic and a static seal in a manner that eliminates the problems discussed above. With the primary component (fluid such as a catalyst), the catalyst valve 97 (e.g., the larger tapered piston) engages a static internal seat, the catalyst valve seat 94. For the secondary component (compressed air), compressed air valve 99 (e.g., the smaller tapered piston) and a captured o-ring 60 engages the compressed air valve seat 95 (e.g., a smooth taper on the inside of the valve housing).

When the dual input valve is opened, the seals are not compressed (catalyst valve 97 separates from the catalyst valve seat 94 and the compressed air valve 99 separates from the compressed air valve seat 95), improving longevity and wear characteristics for the seals, and reducing manufacturing costs involved in chamfering of internal orifices or machining internal grooves. The dual input valve is compact and requires far fewer parts to accomplish the task of controlling the flow of two materials (e.g. catalyst and compressed air). This reduces manufacturing costs, reduces weight and space of the valve, especially when used in hand-held applications, and improves the ease of maintenance for the dual input valve.

Figure 6:
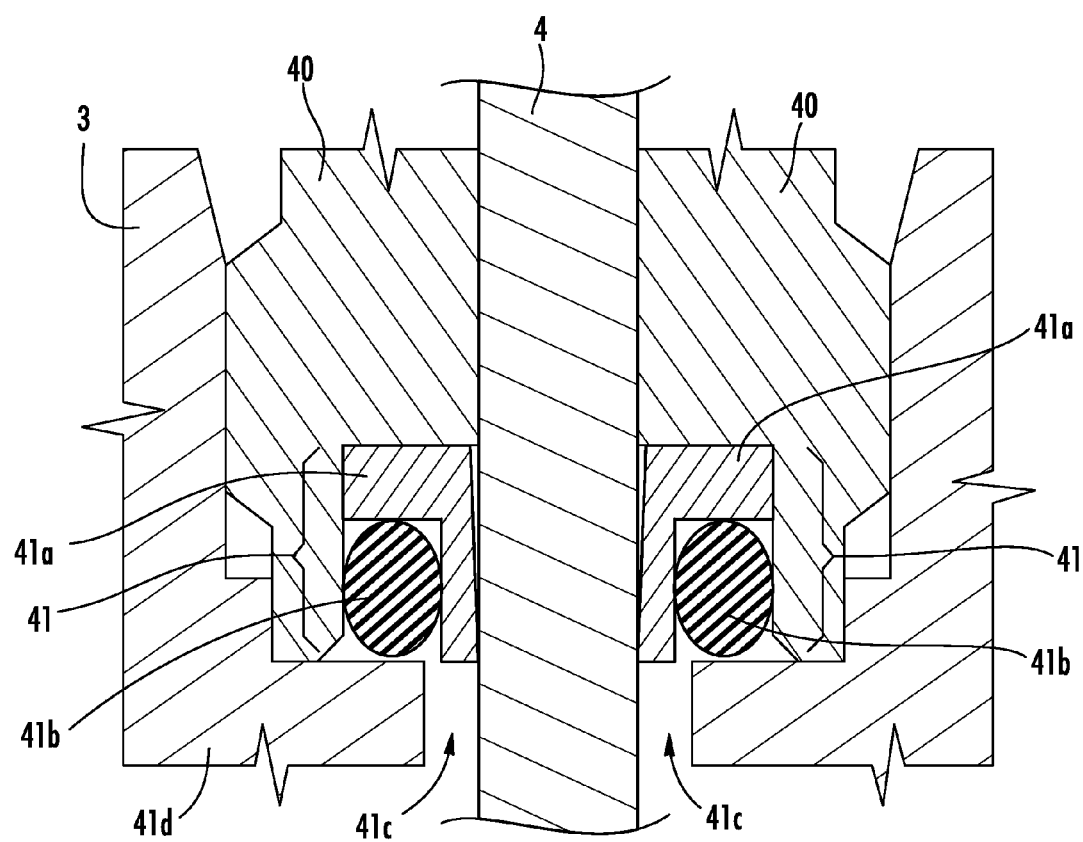
FIG. 6 illustrates a cross-sectional view of a rod seal.

Referring to FIG. 6, a cross-sectional view of a rod seal 41 is shown. In the exemplary spray gun, there are two rod seals 41, one for the dual input valve stem 4 and one for the mono valve actuating rod 26. For brevity, the valve stem 4 is shown in this example. The seal has a lip 41a and a body 41. The rod 4 (e.g. the dual input valve stem 4 or the mono valve actuating rod 26 or, in general, any cylindrical object or shaft) passes through an aperture that follows the axis of the tapered cylindrical body 41. The body 41 of the rod seal (or shaft seal) tapers, preferably linearly, from a higher diameter at an end where the tapered cylindrical body 41 meets the lip 41a to a lower diameter at a distal end at the pressure side of the seal 41c (e.g. air pressure side for the dual input valve or resin pressure side of the mono valve). Likewise, the lip 41a and body 41 have a tapered cylindrical aperture having a greater inner diameter at the lip 41a end and tapering in a preferably linear fashion to a lesser inner diameter at a distal end at the pressure side of the seal 41c, preferably the lesser inner diameter is approximately the same as an outer diameter of the shaft 4, providing for a tight seal between the inner diameter at the distal end and the shaft 4.

In a preferred embodiment, an o-ring 41b applies pressure to the body 41 of the rod seal, thereby forcing tighter contact against the rod 4. Additionally, pressure from the pressure side 41c further pushes against the o-ring 41b and the body of the rod seal 41a, thereby, as pressure increases, the body of the rod seal 41a tightens against the rod 4, thereby reducing potential for leakage.

The body 41 of the rod seal and the o-ring 41b are held between the rod seal housing 40 and the cartridges 41d (either cartridge 3/39). As an example, the cartridge 3/39 threads into the gun head assembly 31 and the rod seal housing 40 snap or is threaded into the cartridge 3/39.

Many materials are anticipated for the lip 41a and body 41 of the rod seal as known in the industry, such as glass/molybdenum filled Teflon, virgin Teflon, UHMW, any Teflon, Nylon, or other high performance plastics.

Figure 7:
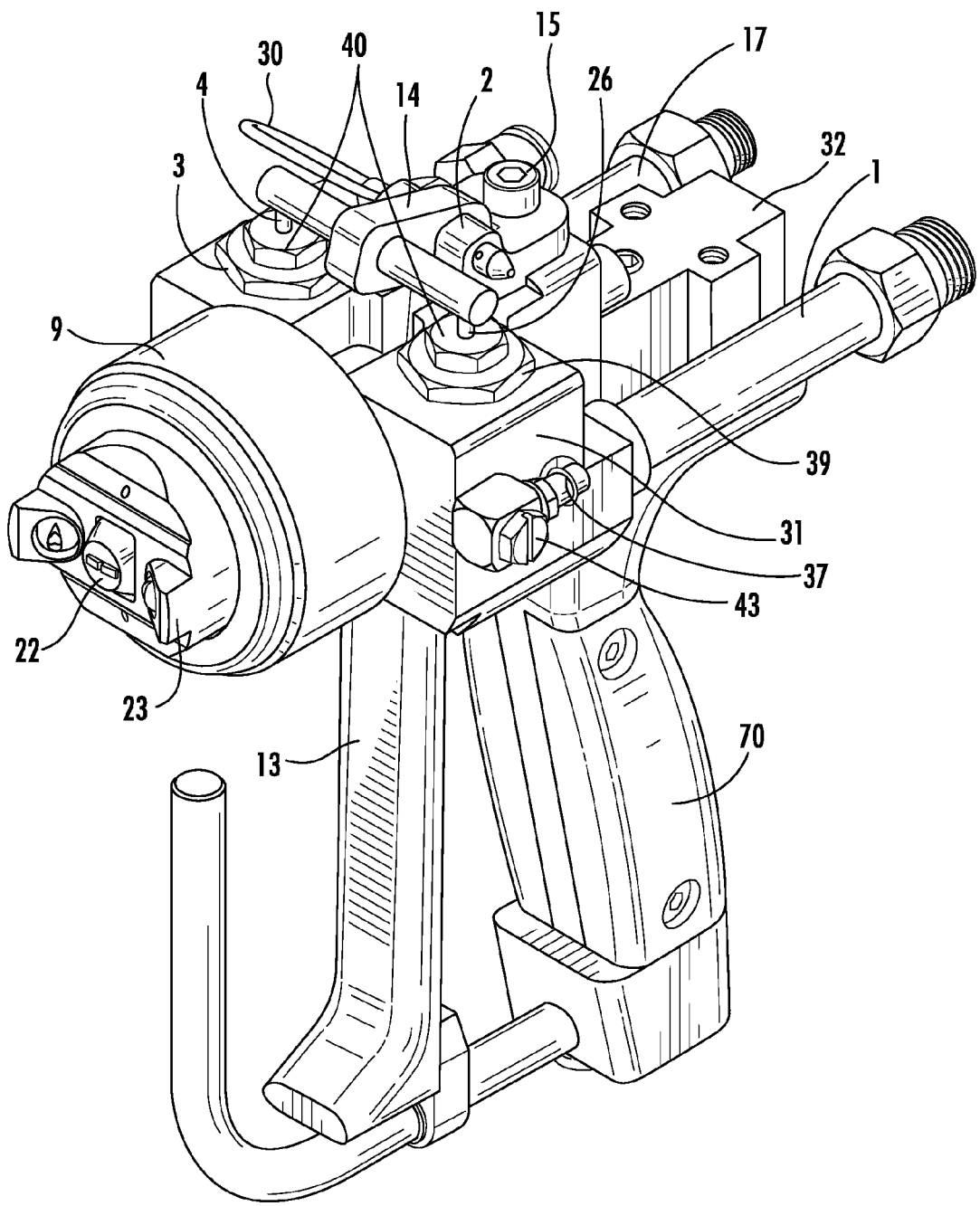
FIG. 7 illustrates a perspective view of the spray gun.

Referring to FIG. 7, a perspective view of the spray gun is shown. Again, the exemplary spray gun disclosed is for illustrative purposes and does not limit any of the inventions disclosed, in that, there are several inventive components and/or subsystems that are disclosed with respect to the exemplary spray gun shown in FIG. 7 and any or all such components and/or subsystems are anticipated for use in a variety of applications and are not limited to the exemplary spray gun. Additionally, it is anticipated that the size, shape, and assembly of the spray gun be varied to meet particular applications.

The spray gun handle 32 is affixed to the gun head assembly 31 by a plurality of cap screws 18 (not visible in FIG. 7). Handle grips 70 are affixed to the sides of the spray gun handle 32 by fasteners 33. The trigger 13 is attached to a trigger arm 14 by a fastener 19. The trigger arm 14 is pivotally held to the spray gun handle 32 by a trigger mount 2 and pivot pin 30. In a preferred embodiment, the pivot pin 30 is a quick release pin 30. The trigger mount 2 is fastened to the spray gun handle 32 by, for example, a cap screw 15. A trigger guard 10 includes a trigger stop 11 shown in a locked position (e.g., preventing the trigger 13 from being activated) and easily rotated to allow activation. The trigger stop 11 is used in an upright position (as shown) to prevent accidental actuation of the trigger 13 or to lock the trigger 13 in the open position during long periods of spraying to reduce fatigue.

The catalyst fitting 17 and resin fitting 1 are shown attached to the gun head assembly 31. Compressed air enters the gun head assembly through a compressed air fitting 5 (not visible). Pressurized air enters the air fitting 5 (not visible) and under control of the trigger and dual input valve, mixes with a catalyst thereby causing the catalyst to "atomize" into droplets.

An air supply port for what is called Air Refinement (used to trim in the edges of the spray pattern coming out of the spray gun) is provided through a fitting 37 (e.g., a barbed fitting) and through an elbow 43 (e.g., a swivel elbow). This pressurized air is used to aim the spray, but is not mixed with the catalyst/resin before the catalyst/resin is sprayed.

A catalyst tip 23 is mounted to the front of the gun head assembly 31 by a retaining ring 9. At the center of the catalyst tip 23 is held a spray tip 23.

Both the mono valve and dual input valve are operated in tandem by the movement of the trigger arm 14. When the trigger 13 is pulled towards the handle 32, the trigger arm 14 swivels around the pin 30 resulting in an actuating pressure on both valve stems 4/26. The valve stems 4/26 are held within chambers of the gun head assembly 31 by an upper sealing that includes cartridges 3/39.

Figure 8:
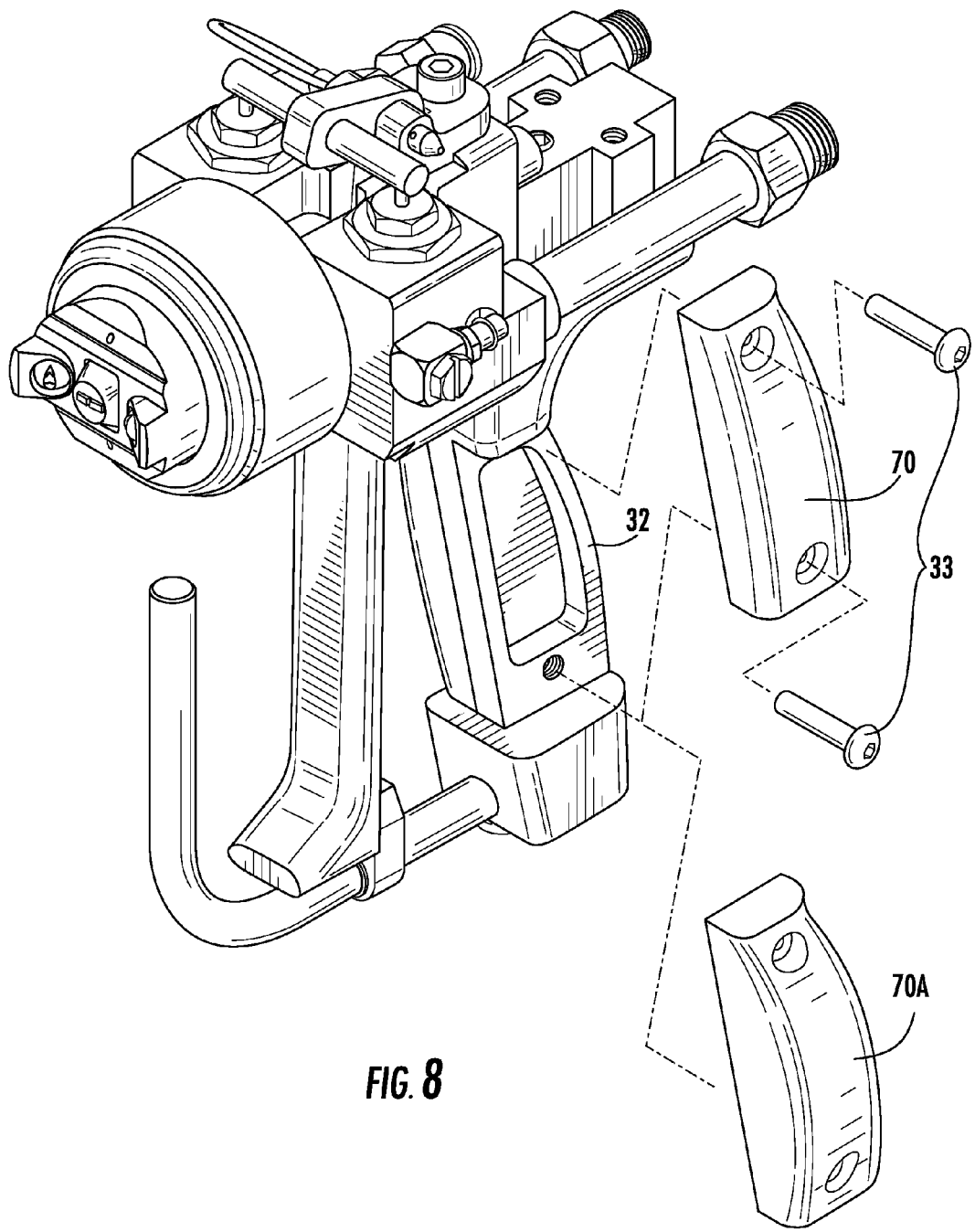
FIG. 8 illustrates a perspective view of the spray gun with interchangeable handle grips.

Referring to FIG. 8, a perspective view of the spray gun with interchangeable handle grip inserts 70/70A is shown. Often, a resin/catalyst sprayer is used to apply resin/catalyst over a large area such as a hot tub, spa, large container, boat hull, etc. For such large objects, long periods of spraying are performed with little time for rest because many resin/catalysts set quickly once mixed and one would not want such a reaction to occur within the spray gun. It is therefore a goal of the disclosed system to be of minimum weight and, hence, the basic design of the mono valve and dual valve, reducing chamber size and part counts.

It is anticipated that different users will have varying hand sizes. A handle designed for a large hand is difficult to grasp by a user with a small hand and a handle designed for a large hand is difficult to grasp by a user with small hands. Furthermore, even though the human anatomy is able to compensate for these size differences, long term use of the wrong size handle potentially adds to fatigue and often leads to cramps or muscle spasms. To reduce such fatigue, the disclosed design has interchangeable handle grip inserts 70/70A. For example, if the spray gun is to be used by a user with small hands, the smaller handle grip insert 70 is attached to the handle by fasteners 33. Likewise, if the spray gun is to be used by a user with larger hands, the larger handle grip insert 70A is attached to the handle by fasteners 33. Any number of handle grip inserts 70 is anticipated including various sizes, different colors (e.g., to distinguish different materials used with the spray gun), and, in some embodiments, having company logos, colors, etc., to customize to the target user in any way necessary.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A shaft seal for reducing leakage between a high pressure side and a low pressure side, the seal comprising:
    a lip at a low pressure end of the shaft seal;
    a tapered cylindrical body extending from the lip, the tapered cylindrical body having a first diameter where the tapered cylindrical body meets the lip and the tapered cylindrical body having a second diameter at a distal end, the distal end exposed to a high pressure fluid; and
    an aperture the aperture passing through the lip and the tapered cylindrical body following an axis of the tapered cylindrical body, the aperture having a first end at the lip and the aperture having a distal second end, the aperture having a first inner diameter slightly greater than an outer diameter of the shaft at the first end and the aperture tapering to a second inner diameter at the distal end of the aperture, the second inner diameter being approximately the diameter of the shaft.

2. The shaft seal of claim 1, further comprising an o-ring, the o-ring positioned around the tapered cylindrical body such that a resilient force of the o-ring applies pressure on the tapered cylindrical body against the shaft and as pressure is exerted against the o-ring, the o-ring exerts additional pressure on the tapered cylindrical body against the shaft.

3. The shaft seal of claim 1, wherein the lip and the tapered cylindrical body are made of glass/molybdenum filled Teflon.

4. The shaft seal of claim 1, wherein the second inner diameter equals the diameter of the shaft.

5. A shaft seal for reducing leakage between a high pressure side and a low pressure side, the seal comprising:
- a lip at a low pressure end of the shaft seal;
- a tapered cylindrical body extending from the lip, the tapered cylindrical body having a first diameter where the tapered cylindrical body meets the lip and the tapered cylindrical body having a second diameter at a distal end, the distal end exposed to a high pressure fluid;
- an aperture the aperture formed along an axis of the lip and an axis of the tapered cylindrical body, the aperture has a first end at the lip and the aperture having a distal second end, the aperture has a first inner diameter slightly greater than an outer diameter of the shaft at the first end and the aperture tapering to a second inner diameter at the distal end of the aperture, the second inner diameter being approximately the diameter of the shaft; and
- an o-ring, the o-ring is mounted around the tapered cylindrical body such that a resilient force of the o-ring applies pressure on the tapered cylindrical body against the shaft and as pressure of the high pressure fluid is exerted against the o-ring, the o-ring exerts additional pressure on the tapered cylindrical body against the shaft.

6. The shaft seal of claim 5, wherein the lip and the tapered cylindrical body are made of glass/molybdenum filled Teflon.

7. The shaft seal of claim 5, wherein the second inner diameter is equal to the outer diameter of the shaft.

* * * * *